Figure 1:
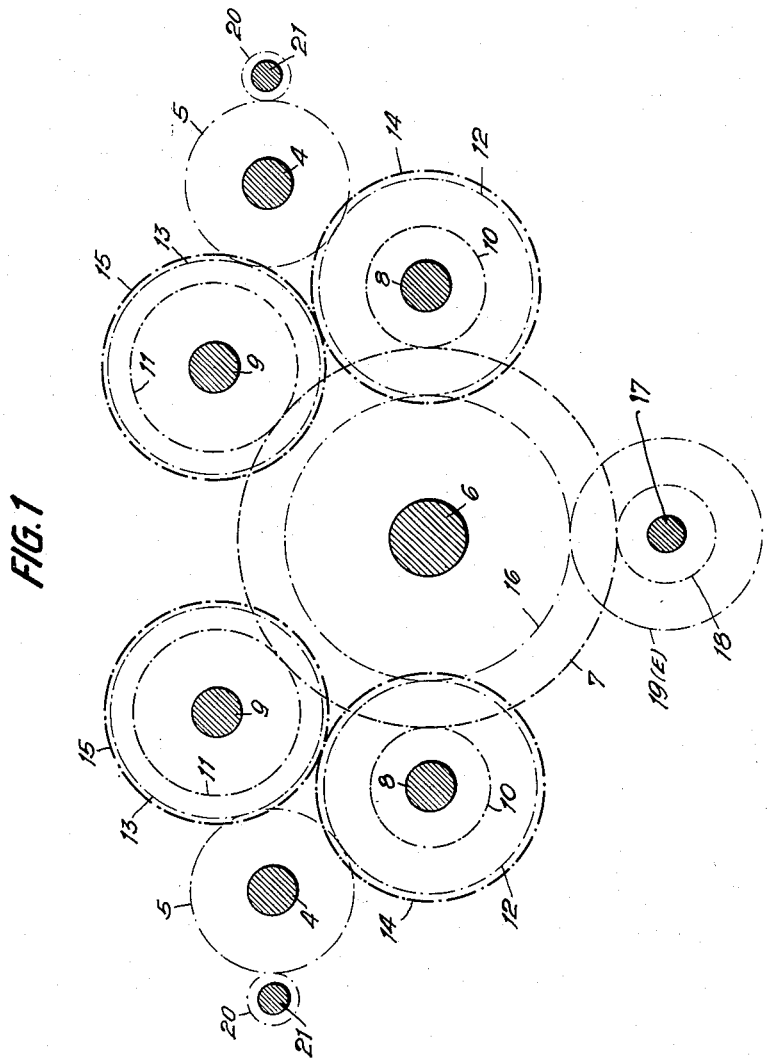

Dec. 8, 1953   F. A. SÜBERKRÜB   2,661,633
SHIP PROPULSION GEAR

Filed Aug. 28, 1951   2 Sheets-Sheet 1

INVENTOR
FRANZ AUGUST SÜBERKRÜB
BY
ATTORNEY:

Dec. 8, 1953     F. A. SÜBERKRÜB     2,661,633
SHIP PROPULSION GEAR
Filed Aug. 28, 1951     2 Sheets-Sheet 2
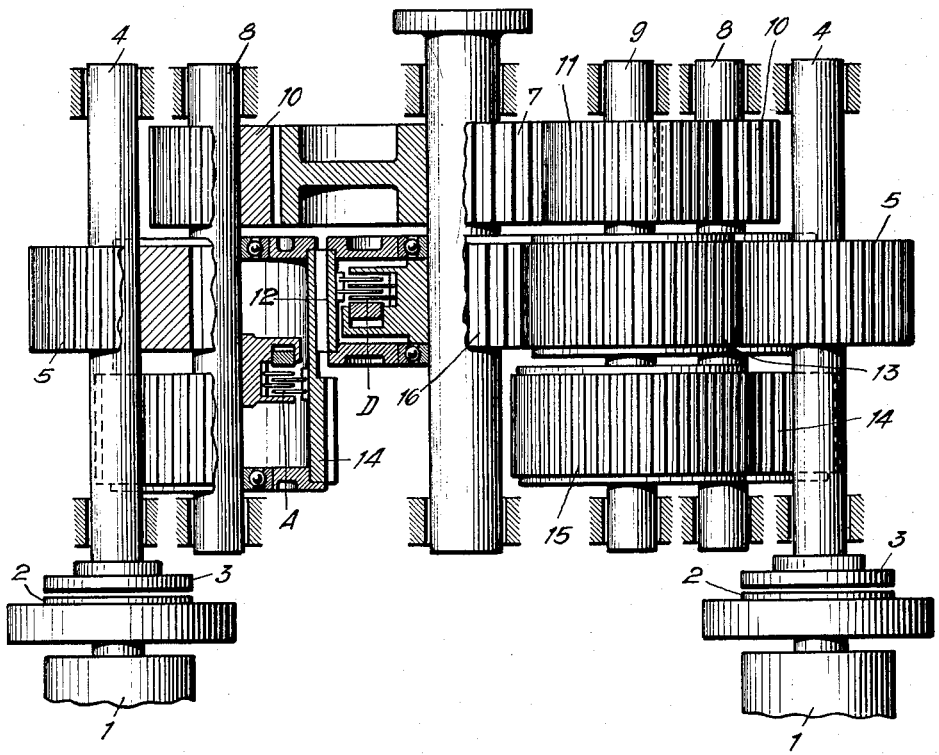
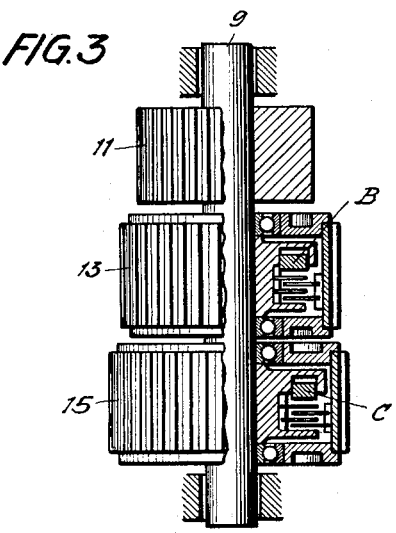
INVENTOR
FRANZ AUGUST SÜBERKRÜB
BY Robert E. Burns
ATTORNEY:

Patented Dec. 8, 1953

2,661,633

UNITED STATES PATENT OFFICE 2,661,633

SHIP PROPULSION GEAR

Franz August Süberkrüb, Hamburg, Germany

Application August 28, 1951, Serial No. 243,998

9 Claims. (Cl. 74—665)

This invention relates to interchangeable speed gears for ship propulsion wherein a single propeller shaft is driven from one or a plurality of engines.

In a screw-propelled ship toothed wheel gears between the engine and the propeller usually serve the purpose of reducing high revolutions of the engine to a lower number of revolutions on the propeller in order to improve the hydraulic qualities of the latter. The torque of an internal combustion engine, and especially of a diesel engine, at the designed mean effective pressure can be varied within small limits only. It is therefore necessary that in order to permit the engine to deliver full power for the varying conditions of torque on the propeller shaft, e. g. while towing or when steaming against wind and sea etc., its revolutions must remain nearly constant.

It is the principal object of this invention to provide interchangeable speed gears for ship propulsion disposed between one or a plurality of engines driving a single propeller shaft whereby to achieve the aforementioned result.

It is another object of the invention to provide an interchangeable speed gear of the character indicated including means for reversing the direction of rotation of the propeller.

It is a further object of this invention to include means for effecting continuous synchronization of the revolutions of a plurality of driving engines arranged to drive a common propeller shaft when the gears are shifted from one speed to another.

In the accompanying drawing wherein is shown, by way of example, an illustrative embodiment of the present invention designed for two motors driving a single propeller shaft, Fig. 1 is a schematic end elevation of a gear embodying features of the present invention designed for two engine shafts driving a common propeller shaft, showing the manner in which the various gear wheels mesh with each other;

Fig. 2 is a plan view, partly in section, of the gear of Fig. 1 showing the two motors, the motor shafts, the propeller shaft on the port side, an upper and a lower intermediate shaft, and on the starboard side, partly in section, the lower of two intermediate shafts; and Fig. 3 is a plan view, partly in section, of the upper intermediate shaft of the gear train shown in Fig. 1.

In the figures the reference numeral 1 designates the engines, which are connected to the drive shafts 4 of the gear by flange or claw couplings, the connecting ends of which are designated by 2 and 3. The drive shafts 4 have drive wheels 5 rigidly mounted upon them. Extension shaft 6 of the propeller shaft carries a second gear wheel 7 similarly rigidly mounted upon it. There are for each motor shaft, e. g. shafts 4, and parallel to said shaft, two intermediate shafts 8 and 9 each carrying a fixed gear wheel 12 and 13, respectively, the gear wheels 12 and 13 having clutch means A and B, respectively, for connecting these gear wheels to their respective auxiliary shafts. Gear wheels 12 and 13 are in meshing engagement with the drive wheels 5 on the motor shafts 4 and gear wheels 10 and 11 mesh with the driven fixed gear wheel 7 on the propeller shaft 6.

The ratio of the diameters of gear wheels 10 and 12 is different from that of gear wheels 11 and 13. It is therefore possible with this arrangement to turn the propeller shaft at two different speeds by bringing either clutch A or clutch B into engagement with its shaft.

For reversing the turning direction of the propeller the two auxiliary shafts 8 and 9 are provided with the additional gear wheels 14 and 15 respectively, both rotatably mounted on their respective shafts and in meshing engagement with each other. Wheel 14 is permanently connected with wheel 12 so that when clutch A is in engagement, wheel 14 is also in engagement with its shaft. Wheel 15 is absolutely independent of its shaft and has clutch means C of its own for selectively connecting it with its shaft.

To reverse direction of rotation of the propeller, clutches A and B are disengaged and clutch C is engaged. The torque of the motor shaft 4 then goes over the wheels 5, 12, 14, 15 and 11 to wheel 7 on the propeller shaft 6. With a gear combining the power of two internal combustion engines on a single propeller shaft it is usual to arrange fluid slip couplings between the engines and the gear in order to avoid the danger of rapid destruction of the teeth due to torsional vibrations of the various engine shafts. Fluid slip couplings, however, are heavy and expensive.

To eliminate the necessity of slip couplings, a gear wheel 16 is rotatably mounted on the propeller shaft and is in meshing engagement with the wheels 12 on the corresponding two auxiliary shafts and thereby indirectly with the fixed gear wheels 5 on the two motor shafts 4. The wheels 5, together with the interposed wheels 12, 16, 12, form a closed gear train 5, 12, 16, 12, 5 with each other so that the motors are compelled always to turn at exactly the same R. P. M., no matter whether clutches A are in engagement or not. If now, in addition, the crank shafts of the motors 1 and the extensions 4 of the motor shafts into the gear are connected in such a way that the cranks are in geometrically equal positions and the ignitions are timed uniformly, the variations of torque during one revolution of both motors are perfectly synchronized and there will be no danger that the teeth of the gear wheels will lose their mutual grip, will chatter or be destroyed.

Furthermore, wheel 16 may be fitted (as shown) with clutch means D to engage it with the propeller shaft 6. With this arrangement, when clutches A, B, C are disengaged and clutch D engaged there will be another ahead speed, the power of the starboard and port motors being transmitted over the wheels 5, 12 and 16 to the common propeller shaft 6.

It is to be further noted that the combination of the two wheels on the propeller shaft 6, namely the fixed wheel 7 and the rotatably-mounted wheel 16, and one or more auxiliary shafts 17 each carrying a fixed wheel 18 and a rotatably-mounted wheel 19 with clutch means (E) (Fig. 1) to engage it to its shaft, the latter two wheels meshing with wheels 7 and 16 respectively, permits a further additional speed reduction. When clutches A, B, C, D are disengaged and clutch E is in engagement, the torque on the motor shafts 4 goes over the wheels 5, 12, 16, 19, 18, 7 to the propeller shaft 6. In this combination, wheels 12 and 16 turn freely on their shafts while the other wheels are connected to their shafts.

The clutches A, B, C, D and E may be of any convenient type but preferably they are laminar disc clutches operated by oil or air pressure. Even with comparatively large power output, laminar disc clutches can be arranged inside of the gear wheels thereby saving considerably in length of the shafts, permitting the shafts to be supported in only two bearings and permitting the size of the gear casing to be reduced to a minimum. Particularly suitable are the laminar clutch arrangements described in my co-pending application Serial No. 210,350 filed February 10, 1951, and shown in Figs. 2 and 3.

With a gear as described hereinabove, it is possible to work with one or two motors at three or even four different ahead speeds and one astern speed, namely over wheels 5, 12, 16 with clutch D in engagement, over wheels 5, 13, 11, 7 with clutch B in engagement, over wheels 5, 12, 10, 7 with clutch A in engagement, over wheels 5, 12, 16, 19, 18, 7 with clutch E in engagement, and for astern, over wheels 5, 12, 14, 15, 11, 7 with clutch C in engagement.

Instead of having the drive wheels 5 directly connected to the engine drive shafts it is, of course, possible to drive them indirectly. Such an arrangement is indicated in Fig. 1 by the circles 20 and 21. In this case wheel (or wheels) 5 turns freely on shaft 4 (or with shaft 4) and is driven by a gear wheel 20 on the extension of the engine drive shaft 21. Since wheel 20, as shown, may be much smaller than wheel 5 there is the possibility of an additional material speed reduction. Such speed reduction is useful, for example, when the driving engines are steam-turbines with high revolutions.

It will be apparent that various other changes and modifications may be made in the embodiments described and illustrated without departing from the invention as defined in the appended claims and it is intended therefore that all matter in the foregoing description and in the drawings shall be interpreted as illustrative only.

What I claim and desire to secure by Letters Patent is:

1. An interchangeable multiple speed toothed wheel reduction and reversing gear mechanism for ship propulsion for driving a single propeller shaft by at least one engine comprising, in combination, a driven wheel fixedly mounted on the propeller shaft, at least one driving wheel, and between said driven wheel and said driving wheel at least two parallel intermediate gear shafts each transmitting a separate speed reduction from the driving to the driven wheel, the said intermediate shafts each carrying one fixed and two rotatably mounted wheels, clutch means for connecting said rotatably-mounted wheels to their respective shafts, the fixed wheel on said shafts meshing with the driven wheel on the propeller shaft, one of the two rotatably-mounted wheels meshing with the driving wheel, the other of said rotatably-mounted wheels meshing with the corresponding wheel on the adjacent intermediate shaft, the rotatably-mounted wheels on one of said intermediate shafts being connected to form a common rotating unit, the rotatably-mounted wheels on the adjacent intermediate shaft being adapted to rotate independently of one another.

2. A toothed wheel gear mechanism as defined in claim 1, wherein the driving wheel is not connected directly to a driving engine but is driven by an additional fixed gear wheel mounted on an extension of the engine drive shaft.

3. A toothed wheel gear mechanism as defined in claim 1, wherein the clutch means are friction clutches.

4. A toothed wheel gear mechanism as defined in claim 1, wherein the clutch means are laminar disc clutches.

5. A toothed wheel gear mechanism as defined in claim 1, wherein the clutch means are disposed on the inside of their respective gear wheels.

6. A toothed wheel gear mechanism as defined in claim 1, wherein the clutch means are gradually operated clutches.

7. A toothed gear wheel mechanism as defined in claim 1, wherein the clutch means are disposed inside of their respective gear wheels.

8. An interchangeable multiple speed toothed wheel reduction and reversing mechanism for ship propulsion for driving a single propeller shaft (6) by at least two engines comprising in combination two driven wheels (7 and 16) on the propeller shaft, one of which (7) is fixedly mounted and the other (16) is rotatably mounted on said shaft, at least two driving wheels (5) driven respectively by said engines and between each of said driving wheels (5) and said fixedly mounted driven wheel (7), at least two parallel intermediate gear shafts (8 and 9) correspondingly arranged with respect to the driving wheels, each two corresponding shafts (8 and 9 respectively) transmitting a separate speed reduction from the driving wheels (5) to the fixedly mounted driven wheel (7), the said corresponding intermediate shafts (8 and 9) each carrying one fixed (10 and 11) and two rotatably mounted wheels (12, 14 and 13, 15) clutch means for connecting said rotatably mounted wheels to their respective shafts, the fixed wheels (10 and 11) on said shafts meshing with the fixed driven wheel (7) on the propeller shaft, one of the two rotatably mounted wheels (12 and 13) on each shaft meshing with the driving wheel (5) and one of them (12) meshing also with the rotatably mounted wheel (16) on the propeller shaft, the other of said rotatably mounted wheels (14) on one of the intermediate shafts meshing with the corresponding wheel (15) on the adjacent intermediate shaft, the rotatably mounted wheel (12 and 14) on one of said intermediate shafts (8) being connected to form a common rotating unit, the rotatably mounted wheels (13 and 15) on the adjacent intermediate shaft (9) being adapted to rotate independently of one another.

9. A toothed wheel gear mechanism as defined by claim 8, comprising clutch means for connecting the rotatably mounted gear wheel on the propeller shaft to said shaft.

FRANZ AUGUST SÜBERKRÜB.

No references cited.